United States Patent
Shaw (10) Patent No.: US 12,327,317 B2
(45) Date of Patent: Jun. 10, 2025

(54) TECHNOLOGY CONFIGURED TO FACILITATE CLIENT DEVICE ENGAGEMENT WITH THREE-DIMENSIONAL ARCHITECTURAL MODELS

(71) Applicant: Envision VR Pty Ltd, Roseville (AU)

(72) Inventor: Michael Shaw, Roseville (AU)

(73) Assignee: Envision VR Pty Ltd, Roseville (AU)

( * ) Notice: Subject to any disclaimer, the term of this patent is extended or adjusted under 35 U.S.C. 154(b) by 55 days.

(21) Appl. No.: 17/936,985

(22) Filed: Sep. 30, 2022

(65) Prior Publication Data

US 2023/0104636 A1   Apr. 6, 2023

(30) Foreign Application Priority Data

Oct. 1, 2021   (AU) ................................ 2021240311

(51) Int. Cl.
  *G06T 7/70*  (2017.01)
  *G06F 3/04815*  (2022.01)
  *G06T 19/00*  (2011.01)

(52) U.S. Cl.
  CPC ........ *G06T 19/003* (2013.01); *G06F 3/04815* (2013.01); *G06T 7/70* (2017.01); *G06T 2219/024* (2013.01)

(58) Field of Classification Search
  CPC ... G06T 19/003; G06T 7/70; G06T 2219/024; G06F 3/04815; G06F 9/451; G06Q 50/16
  See application file for complete search history.

(56) References Cited

U.S. PATENT DOCUMENTS

| | | | |
|---|---|---|---|
| 2003/0172087 A1* | 9/2003 | Godwin | G07C 9/27 |
| 2015/0363967 A1* | 12/2015 | Wells | G06T 19/00 345/419 |
| 2018/0330542 A1* | 11/2018 | Bharti | G02B 27/0172 |
| 2019/0088016 A1* | 3/2019 | Tadros | G06T 19/003 |
| 2019/0164330 A1* | 5/2019 | Sugano | G06T 19/006 |
| 2020/0034622 A1* | 1/2020 | Thakurta | G06V 40/20 |

\* cited by examiner

*Primary Examiner* — Jitesh Patel
(74) *Attorney, Agent, or Firm* — TraskBritt (57) ABSTRACT

Technology is configured to facilitate client device engagement with three-dimensional architectural models. A particular focus of the technology is enabling users of mobile and/or VR devices to perform virtual property inspections, including in a collaborative engagement scenario. While some embodiments will be described herein with particular reference to those applications, it will be appreciated that the present disclosure is not limited to such a field of use, and is applicable in broader contexts.

18 Claims, 2 Drawing Sheets

TECHNOLOGY CONFIGURED TO FACILITATE CLIENT DEVICE ENGAGEMENT WITH THREE-DIMENSIONAL ARCHITECTURAL MODELS

CROSS-REFERENCE TO RELATED APPLICATIONS

Pursuant to 35 U.S.C. § 119(a), this application claims the benefit of the filing date of Australian Patent Application Serial No. AU2021240311, filed Oct. 1, 2021, for "TECHNOLOGY CONFIGURED TO FACILITATE CLIENT DEVICE ENGAGEMENT WITH THREE-DIMENSIONAL ARCHITECTURAL MODELS," and Australian Patent Application Serial No. AU2021240312, filed Oct. 1, 2021, for "TECHNOLOGY CONFIGURED TO FACILITATE CLIENT DEVICE ENGAGEMENT WITH THREE-DIMENSIONAL ARCHITECTURAL MODELS," the disclosure of each of which is hereby incorporated herein in its entirety by this reference.

TECHNICAL FIELD

The present disclosure relates, in various embodiments, to technology configured to facilitate client device engagement with three-dimensional architectural models. A particular focus of the technology is enabling users of mobile and/or VR devices to perform virtual property inspections, including in multi-modal and collaborative engagement scenarios. While some embodiments will be described herein with particular reference to those applications, it will be appreciated that the present disclosure is not limited to such fields of use, and is applicable in broader contexts.

BACKGROUND

Any discussion of the background art throughout the specification should in no way be considered as an admission that such art is widely known or forms part of common general knowledge in the field.

Property inspections have conventionally been performed via a physical "in-person" approach. For example, people would gather at a property during a designated time for the purpose of inspection, during which time a real estate representative would usually be present.

In recent years, technology has enhanced the ability to perform inspections in a virtual context. For example, 360 cameras have allowed for virtual walkthroughs and the like. There remain various technical limitations and challenged associated with virtual inspections.

BRIEF SUMMARY

It is an object of the present disclosure to overcome or ameliorate at least one of the disadvantages of the prior art, or to provide a useful alternative.

Example embodiments are described below in the section entitled "claims".

Reference throughout this specification to "one embodiment," "some embodiments" or "an embodiment" means that a particular feature, structure or characteristic described in connection with the embodiment is included in at least one embodiment of the present disclosure. Thus, appearances of the phrases "in one embodiment," "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

The description below refers to "systems" and "modules". The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out". The statement becomes meaningless if the determination as to whether something is A is not performed.

The term "system" refers to an arrangement where multiple computers, hardware configurations, and devices are interconnected via a communication network (including a one-to-one communication connection). The term "system," and the term "device," also refer to an arrangement that includes a single computer, a hardware configuration, and a device. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a ledger within a CPU (Central Processing Unit).

BRIEF DESCRIPTION OF THE DRAWINGS

Embodiments of the present disclosure will now be described, by way of example only, with reference to the accompanying drawings in which.

DETAILED DESCRIPTION

The present disclosure relates, in various embodiments, to technology configured to facilitate client device engagement with three-dimensional architectural models. A particular focus of the technology is enabling users of mobile and/or VR devices to perform virtual property inspections, including in a collaborative engagement scenario. While some embodiments will be described herein with particular reference to those applications, it will be appreciated that the present disclosure is not limited to such a field of use, and is applicable in broader contexts.

Example System for Enabling Shared Experience Delivery

One embodiment provides a system, which is configured to enable client device engagement with three-dimensional content, thereby to enable virtual property inspections. The system may include one or more server devices, which interact with a plurality of client devices. The client devices preferably include smartphone/tablet devices, and virtual reality devices (for example headsets).

In examples below, the three-dimensional content is described by reference to models, which represent physical spaces, for example, virtual spaces, which represent real estate settings (such as houses, apartments, office space, industrial space, commercial space, and the like), but the technology may be applied to other settings also. For the examples described below, 3D architectural models are first generated, using one or more of the numerous platforms available for such purposes. These are then ingested and normalized into a standardized form, which is optimized for rendering via the Unity engine (or a similar technology), such that the models can be experienced via consumer-level client devices (such as smartphones and VR headsets).

The term "virtual property inspection" as used herein describes a process whereby a user of a computing device, for example a smartphone, tablet or VR device, experiences three-dimensional content representative of a property (for example a house, apartment, townhouse, office space, or the like). There is a particular focus on inspection of properties based on 3D models derive from 3D architectural models (as opposed to models derived from scanning of an existing physical space). For example, embodiments are particularly directed to scenarios where there might not yet be a physical real-world space constructed (for example in the context of "off-the-plan" purchasing).

Figure 1:
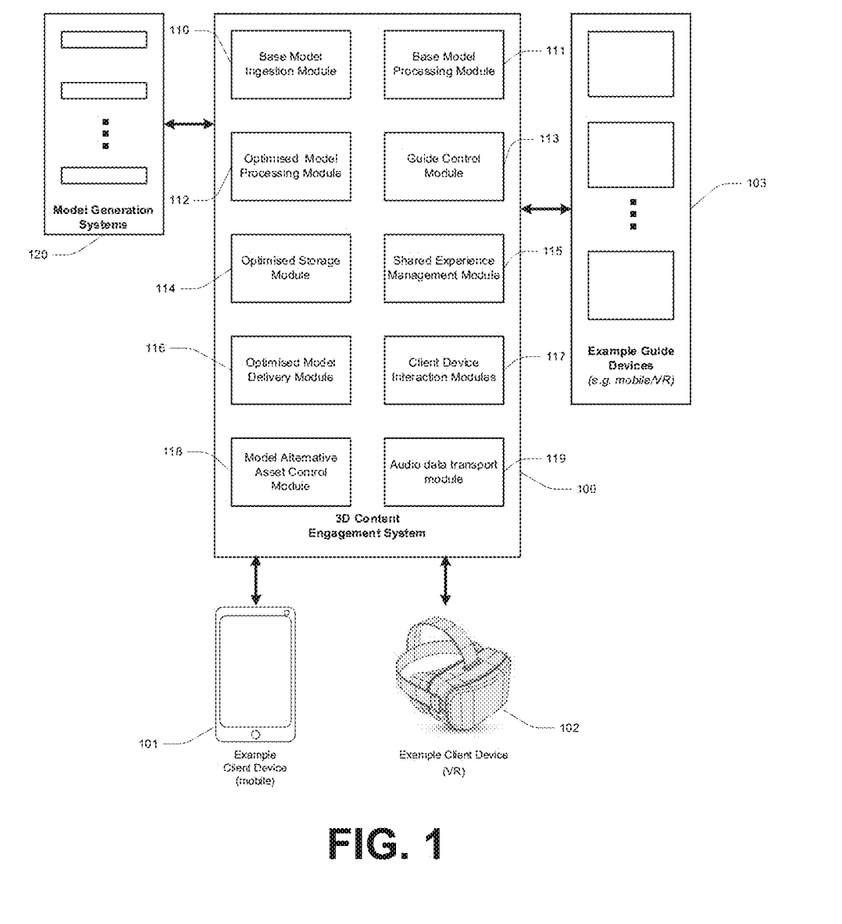
FIG. 1 illustrates a system according to one embodiment.

In the example of FIG. 1, a 3D Content Engagement System 100 is a server system, which is configured to enable client device engagement with three-dimensional content, thereby to enable virtual property inspections. System 100 is configured to receive and process requests from a plurality of client devices. Example client devices are illustrated: a mobile device 101 and a VR device 102.

The requests received from client devices 101 and 102 include the following:

(i) A request to access a specified three-dimensional model, in which case the server system is configured to enable downloading to the relevant client device of computer executable code representative of the model, such that the model is renderable at the client device. For example, each client device executed a respective instance of a software application, which is configured to enable section of a model (e.g., by the name of a location), downloading of 3D data, and rendering of that data as a 3D virtual environment (for example using a Unity engine or the like). For the present purposes, "software applications" is referred to as a "Virtual Inspection App," or "VIA."

(ii) A request to operate as a guide device, in which case the server system is configured to enable hosting by the client device of a collaborative viewing event. In the illustrated embodiment, in the event that a client device 101 or 102 provides such a request, that device becomes a guide device 103. In some cases "ordinary" users of the VIA are prevented from providing requests to operate as guide devices, which may be achieved via various means (for example by filtering software functions based on user log-on credentials). For the purposes herein, a user of a guide device is referred to as an "inspection guide," and may in practice be a real estate agency representative or the like.

(iii) A request to operate as a participant device, in which case the server system is configured to enable participation by the client device of in the collaborative viewing event. In some embodiments, where a user does not have access permission to operate as a guide device, the request to operate as a participant device is default/inferred. For the purposes herein, a user of a guide device is referred to as an "inspection viewer," and may in practice be a person interested in purchasing real estate.

These and other requests are received by system 100 via client device interaction modules 117. In the present example, models downloaded to and rendered by client devices are also referred to as "optimized" models.

In the present embodiment a user interacts with the VIA on their respective client device 101/102, selects a model (i.e., property/location) via interaction with client device interaction module 117, and is delivered data representative of the relevant 3D model assets via a model delivery module 118 (regardless of whether the device has guide or participant status). In the case of a participant device, a user is able to join a scheduled shared experience (this may be scheduled by a central scheduling system, and/or a shared experience may be joined for a given model by a participant any time that model is rendered, even if there are no inspection guides present).

System 100 includes an engagement management module, which is configured to facilitate concurrent multi-device engagement with a common three-dimensional model during a collaborative viewing event. In FIG. 1, this is illustrated as a Shared Experience Management Module 115. A "collaborative viewing event" is defined as a period of time during which at least one guide device and at least one participant device concurrently render the same model (from a common physical location—an "onsite virtual inspection," or from geographically distinct locations—a "remote virtual inspection").

Shared experience management module 115 is configured to enable a multi-modal viewing experience for inspection viewers (and in some embodiments inspection guides). As context, whilst known VR/AR technologies are in some ways well adapted to be implemented in the context of virtual inspections of real estate, the technology suffers from a number of problems that reduce its effectiveness in the context of virtual inspections. Various embodiments provide technological means to overcome such problems. In overview, these include:

Inspection viewer technological competence. Wide-scale implementation of virtual inspection technology is problematic due to widespread inexperience across potential inspection viewers in the use of VR/AR navigation. There is presently a relatively random distribution across society between persons familiar with use of such technology (and/or excited to embrace such technology) and persons without such experience (and/or reluctant or scared to embrace such technology). This creates a significant technological hurdle in terms of accessing the same market of customers as might be available without the presence of VR/AR technology. A solution proposed herein for some embodiments, and discussed in more detail below, is to provide through the VIA two different inspection viewer experience modes, including a first mode where the inspection viewer is empowered to utilize VR/AR navigation themselves, and a second mode where the inspection viewer passively views their device with navigation being handled by the inspection guide.

Real-time situational awareness for inspection guides. In a "real-world" context, inspection guides such as real estate agents are required as part of their work to develop strong situational awareness skills, for example, the ability to observe the behavior of viewers, and engage individually/collectively as relevant. In real-life situations, it is expected that an agent will effectively concurrently manage a number of viewers spread across a property. VR/AR technology does not inherently lend itself to enabling carry over of such competence, for example, due to difficulty in monitoring the activities of inspection viewers from the virtual POV of an inspection guide. Some embodiments provide solutions to this problem via an "observation mode," which allows an inspection guide to access a real-time view (and in some cases later access a recorded version thereof) for each inspection viewer (optionally via multiple concurrent display objects, which each provide a current view for a respective inspection viewer's participant device). The inspection guide is additionally enabled to selectively engage in 1-to-1, 1-to-few, or 1-to-all audio communications with inspection viewers. This provides technological tools to enable the inspection guide to efficiently and in real time observe and engage with multiple inspection viewers at different locations in the virtual environment. As a practical example, this might allow an inspection guide to quickly toggle between a discussion with a first inspection viewer looking at a dishwasher to another scrutinizing fixture in a bathroom (and then optionally provide certain information as a broadcast to all inspection viewers in a property).

Issues relating to solo-inspection. Unlike real world scenarios, where it is almost always the case that a property inspection will be a shared experience with a real estate agent representative present, the use of technology of the sort disclosed herein allows for solo-inspections (i.e., a user of a participant device accessing and viewing a virtual space at their own convenience, outside of any shared experience involving an inspection guide). This again affects the ability of a real estate representative to have situational awareness. A solution provided by some embodiments is a viewer analytics engine, which is a software module configured to record data representative of each inspection viewer's interaction with a given model.

This is discussed in more detail further below. In short, this module enables compilation of data-driven insights, which enable improved awareness of aspects of a model, which have been focus of attention for a given inspection viewer.

In some embodiments, shared experience management module 115 is configured to provide at least two modes of engagement, including:

A first mode of engagement, described herein as a "self-guided mode." Each participant device selecting the "self-guided mode" engagement is enabled to control navigation in a three-dimensional environment rendered from downloaded data representative of the common three-dimensional model. That is, for example, using VR hardware they are able to move around and inspect a virtual space defined by the three-dimensional environment. In a practical use case, this allows users to move around an inspection area at their own discretion.

A second mode of engagement, described herein as an "agent-guided mode." Each participant device selecting the second mode of engagement is enabled to experience the three-dimensional based on navigation instructions inputted by a guide device hosting the collaborative viewing event. In a practical use case, this allows an agent or the like to show users around an inspection area, without the users needing to input navigation instructions.

The provision of both modes open up virtual inspections to a wider range of users, including both users with familiarity/competency in navigating virtual spaces, and users without such familiarity/competency.

In the illustrated embodiment, system 100 includes an audio data transport module 119, which is configured to enable audible communications during a collaborative viewing event between the host device and the (or each) participant device. This is in some embodiments one-way communication (guide to participant), and in other embodiments two-way communication. In some embodiments there is a control such that only one participant device is able to engage in audio communication with the guide device at any given time. It will be appreciated that in some cases the audio data transport module is a plugin provided via a 3D rendering platform, for example, Unity.

In a preferred embodiment, a user of a device operating as a guide device is provided with access to an "observation mode" in respect of a current collaborative viewing event. This is triggered by a user of the guide device selecting the observation mode, for example, via a UI button or the like. The user of the guide device is then provided with a display object, which renders a view corresponding to that being viewed by a participant device, which has selected the first mode of engagement, and is engaging in controlled navigation in a three-dimensional environment (i.e., the second mode of engagement). This allows the user of the guide device is able to observe that controlled navigation.

From a practical perspective, this may be used to allow a real estate agent or the like to observe the manner in which a potential buyer interacts with the virtual environment in real time, and provide audio commentary to assist. In this regard, the observation mode functions to some degree as a reverse of an "agent-guided mode," in what might be termed a "buyer-guided mode" whereby the inspection guide is enabled to experience the three-dimensional based on navigation instructions inputted by a participant device hosting the collaborative viewing event. Preferably, where there are multiple participant devices using the second mode of engagement, the user of the guide device is enabled to toggle between those participant devices, thereby to observe and interact with multiple participants.

In some embodiments, the inspection guide is able to view the current rendering view of multiple participant devices simultaneously via side-by-side display objects. In some embodiments, the UI provides multiple display objects, each providing a view corresponding to what is currently rendered on each participant device in a shared experience. Preferably, each UI display object is associated with a communication control object, enabling the inspection guide to selectively engage in 1-to-1 audio communications with selected one (or multiple) inspection viewers. In some embodiments, a further object is provided to facilitate broadcast audio by the inspection guide to all inspection viewers.

In a preferred embodiment, audio communications by inspection viewers are communicated to the inspection guide in a 1-to-1 manner, with the guide device UI providing a visual marker associated with a display objection associated with that inspection viewer (and providing the relevant real-time POV rendered by that inspection viewer).

In some embodiments, system 100 includes an inspection viewer analytics module, which is configured to record data representative of inspection viewer navigation activities, process that data, and deliver reports/data insights to a guide device and/or other central location. This may, for example, be based on a rules engine, which records events in relation to any one or more of the following:

A specified model object occupying a threshold size in the inspection user's POV for greater than a threshold period.

A specific region occupying a threshold size in the inspection user's POV for greater than a threshold period.

This allows for analytics such as the number of times a particular inspection viewer has taken a "long stare" at a particular object or region, and cumulative time spent starting at such objects/regions. This provides useful analytics in terms of aspects of a property that are of interest to that viewer, and the relative significance of those aspects. A user with access to such data is then able to quickly gain situational awareness over that person's interests/concerns and the like, and continue their engagement accordingly.

In some embodiments, in addition to (or as an alternative to) ability to adopt the first and second mode of engagement for the purposes of shared experiences, system 100 in conjunction with the VIA is configured to provide for multi-modal engagement with three-dimensional content. This enables users to experience models via a plurality of rendering approaches, which preferably include a reduced-scale mode and a full-scale mode.

In this regard, some embodiments include a method for enabling engagement with a three-dimensional model via a device having a display screen and a camera module, which provides for a reduced-scale mode and a full-scale mode. The device may include a VR headset, tablet, smartphone, or the like (and optionally combinations of these devices). The method includes accessing data representative of a three-dimensional model, and selecting between a reduced-scale mode and a full-scale mode. In response, a software module causes rendering of the three-dimensional model via the display screen, thereby to enable a user to navigate a rendered three-dimensional virtual environment whereby three-dimensional model is projected relative to a physical world environment. The nature of projection differs between the reduced-scale mode and the full-scale mode. For example, in some embodiments this is configured as described below:

In the reduced scale mode, the three-dimensional model is projected as a virtual environment locked in position and orientation to a physical environment captured by the camera module and shown on the display screen, projected at a scale of less than 2:1. Preferably, the scale is approximately 50:1 or 100:1. In some cases, the scale is determined relative to the size of a physical world surface identified via processing of image data captured via the camera model, being a surface onto which the model is to be projected via augmented reality technology. For example, the physical world surface may be a table or floor area. In the reduced scale mode, a user is enabled to toggle display of one or more display layers and/or artefacts of the three-dimensional model (or some layers/artefacts are by default omitted), thereby to facilitate internal navigation of an enclosed virtual space from an external viewing position. For instance, a ceiling/roof or the like is omitted, enabling convenient top-down three-dimensional viewing of an interior space represented by the 3D model. In another example, a UI object is provided, which enables control over z-axis model rendering, with reduction in z-axis rendering progressively removing a roof area to a ceiling and optionally beyond (for example, via a slider object).

In the full-scale mode, the three-dimensional model is projected as a virtual environment locked in position and orientation to a physical environment (which may again be captured by the camera module and shown on the display screen) at a scale of 1:1. This may include projecting the model onto a floor area, or an area of land on which a building represented by the 3D model might be constructed.

Via this approach, using a single device/software platform, a user is enabled to experience a virtual real estate inspection at a micro and macro level, enabling top-down navigation of a property and a virtual full-scale walkthrough of that property. Both can be facilitated via a phone/tablet display (e.g., via an AR arrangement and/or navigable 3D interface) and/or a headset (i.e., VR).

In a preferred embodiment, both the reduced-scale mode and the full-scale mode are able to be controlled via the first and second modes described above, allowing for guided and/or user-controlled navigation.

Preferably, objects in the model that are representative of windows/openings are rendered in a "transparent" manner, such that real-world video capture is projected on those objects during virtual environment rendering. In the full-scale mode, where the model is projected onto a land area onto which a property is proposed to be constructed, this allows a user to experience a real-world view out of windows in an immersive manner.

Via the technology described above, VR/AR technologies are able to be implemented in the context of a property inspection setting, with alterations made to conventional operation of such technologies implemented thereby to overcome technological challenges unique to that implementation context. This conveniently allows for virtual property inspections to be conducted by a range of users of differing technological competencies, with real-time and delated situational awareness, across a range of use-case situations (e.g., top down models and full scale models), and via a wide range of existing user devices (including phones, tablets, PCs, laptops and VR/AR headsets). Technology described herein this this manner solves various technical challenges associated with implementation of VR/AR technologies to virtual inspections.

As noted above, the three-dimensional content is described by reference to models, which represent physical spaces, for example, virtual spaces, which represent real estate settings (such as houses, apartments, office space, industrial space, commercial space, and the like), but the technology may be applied to other settings also. For the examples described below, 3D architectural models are first generated, using one or more of the numerous platforms available for such purposes. These are then ingested and normalized into a standardized form, which is optimized for rendering via a real time rendering engine (for example, the Unity engine, Unreal engine, or a similar technology), such that the models can be experienced via consumer-level client devices (such as smartphones, tablets and VR headsets).

In the context of FIG. 1, architectural models are generated via a plurality of model generation systems 120. For example, these may include computers executing software packages such as 3DSMAX, MAYA or VRAY. This results in generation of project files for "base models." These "base models" typically require a significant degree of processing power to view, and as such are not suitable for consumption via smartphones and the like. System 100 is configured to convert these base models into "optimized models," which are optimized for delivery over a conventional Internet (including mobile Internet) connection, and rendered at client devices such as client devices 101 and 102. For example, persons skilled in the art will recognize various technologies appropriate for the present circumstances, and how those are implemented. Preferred embodiments make use of models that are optimized for game engines, which support delivery via mobile and/or VR interfaces. An example is the Unity engine (no affiliation with the Unity engine or its providers is represented by that example).

System 100 includes a base model ingestion module 110, which is configured to receive project files for a base model from one of systems 120. A base model processing module 111 receives the project files and performs a series of steps to convert the base model files, which may be a variety of formats, into a predefined format with set attributes optimized for rendering via a game engine (such as the Unity engine) at mobile devices.

Base model processing module 111 exports a set of project files for an optimized model. This is optionally subjected to further processing via module 112 (for example, in response to feedback from a commercial client), and when finalized added to an optimized model storage module 114. Data in module 114 is then, in response to instructions triggered by module 117, delivered to client devices via an optimized mode delivery module 116. Manual and automated processes to correct errors that may occur when rendering with the present disclosure including but not limited to: creating new vertex arrays from existing geometry, automatically detecting and correcting vertex normal errors, packing mesh UVW maps into atlases with optimal texel density for display within embodiments of the present disclosure and processes of rendering image data directly onto the model.

In some embodiments, each optimized model is associated with two or more sets of model assets. Each set of model assets includes a respective collection of three-dimensional objects renderable at predefined locations in the three-dimensional environment rendered from downloaded model data. For example, this may include furniture and the like. Each device is configured to enable swapping between viewing of the two or more sets of model assets, thereby to enable viewing of a space with different styling. In the illustrated embodiment, system 100 includes a model alternate asset control module 118, which is configured to enable, during a collaborative viewing event, a control instruction provided via the host device to trigger swapping between viewing of the two or more sets of model assets at one or more participant devices. This allows the host to control the styling of a space during collaborative viewing, which may be practically relevant in terms of performing a guided inspection using guide control module 113.

In some embodiments, each optimized model is associated with one or more associated optimized model. Each associated optimized model represents the same space, but with different collections of three-dimensional objects renderable objects and/or stylings (for example, colors, textures, and the like). In this manner, each associated optimized model allows experiencing of the same space, but in a different style/look. Each device is configured to enable swapping between viewing of the optimized model and he one or more associated optimized models, thereby to enable viewing of a given space with different styling. In such an embodiment, module 118 is replaced by a model switching control module, which is configured to enable, during a collaborative viewing event, a control instruction provided via the host device to trigger swapping between viewing different associated models at one or more participant devices. This allows the host to control the styling of a space during collaborative viewing, which may be practically relevant in terms of performing a guided inspection. For collaborative or individual viewing events, a model switch control module is configured to control initial positional/ POV settings, such that upon switching from a current model to a new model, the user(s) view(s) within the space remain unchanged relative to the common properties of the space across the models (the models show the same space, so features such as walls are in the same locations). In this manner, a user has a seamless experience in transitioning between models, in that their field of view settings appear the same upon transition relative to the underlying space structure.

Shared Virtual Experience Management in Common Physical Location

As noted above, collaborative viewing events provided by system 100 may include inspections performed by multiple parties at a common physical location—an "onsite virtual inspection," or from geographically distinct locations—a "remote virtual inspection."

In the context of onsite virtual inspections, there is a technical/practical problem, which arises where multiple persons use VR headsets to navigate a common space at the same time, given the risk that they collide. A technical solution exists, but this requires use of hardware, which implements antilatency technology, adding to costs of implementation. Described below is an alternate technical solution, which can be implemented using conventional VR headsets.

In overview, in some embodiments shared experience management module 115 is configured to enable a plurality of client devices, in the form of Virtual Reality headset devices such as client device 102, to concurrently experience a common virtual environment whilst physically located in a physical environment. Each device performs a process thereby to determine a current position and orientation of the device based on comparison of artefacts (for example, landmarks identified by AI processing) in image data collected by the device and artefacts in the model data, and the shared experience management module is configured to receive current position and orientation data for a first one of the devices and provides to one or more other client devices data thereby to enable rendering of an avatar representing current location of a user of the first one of the devices.

Figure 2:
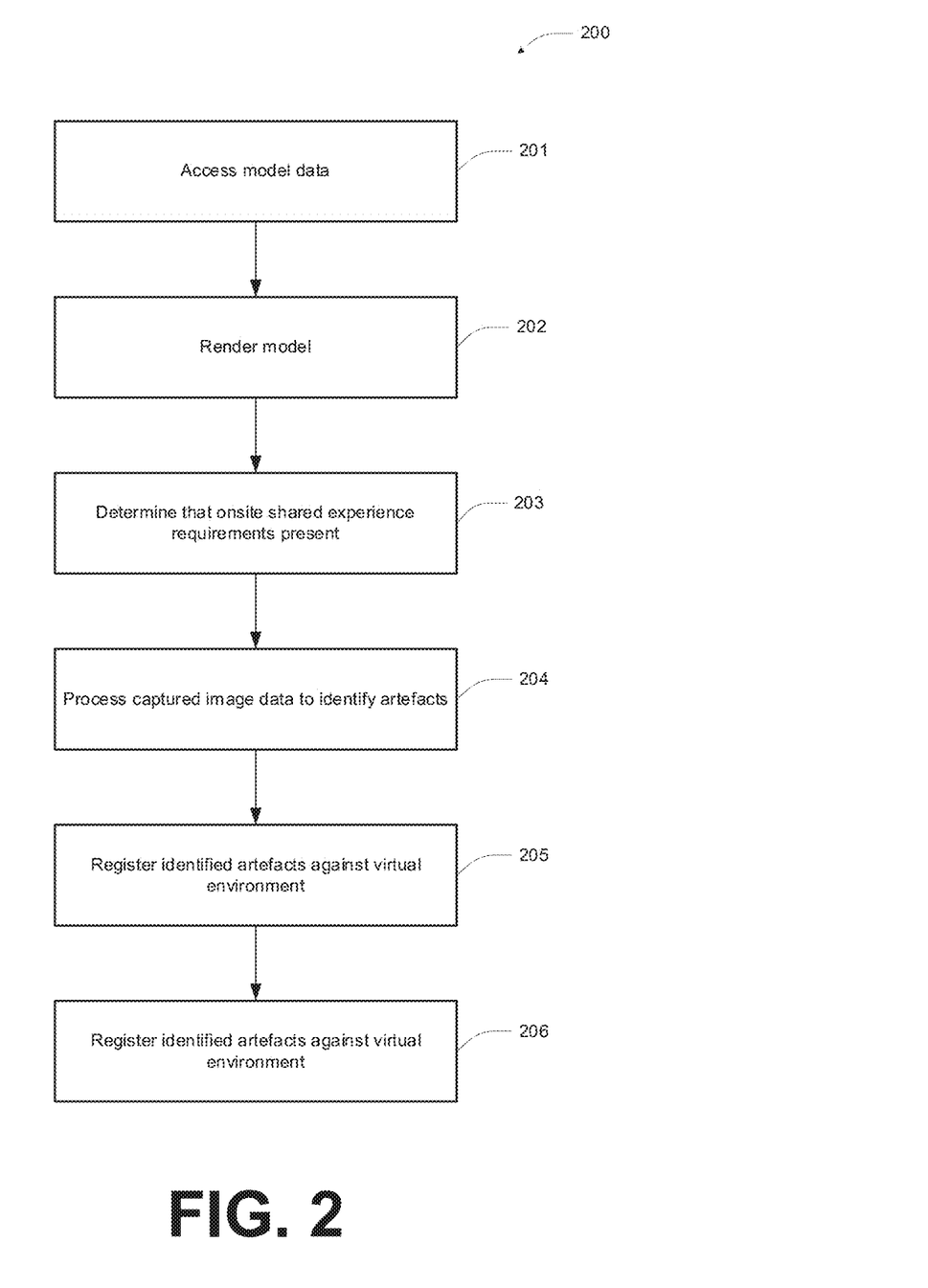
FIG. 2 illustrates a method according to one embodiment.

FIG. 2 illustrates a method 200 according to one embodiment, being a method for enabling virtual reality engagement in a physical space via a device having a display screen and a camera module (for example, a conventional VR headset, such as an Oculus Quest or HTC Vibe).

Functional block 201 represents a process including accessing data representative of a three-dimensional model. For example, using the context of FIG. 1 as an example, a user executes the VIA, and interacts with a selection interface to select a particular location for viewing (this may alternately be automatically selected). Model data is then either downloaded from server system 200, or located in local memory.

Functional block 202 represents rendering the three-dimensional model via the display screen, thereby to enable a user to navigate a rendered three-dimensional virtual environment (e.g., using the VIA).

Functional block 203 represents a process including determining that user is part of an onsite shared experience. In practice, an onsite-shared experience is where: (i) a user is located in a particular physical space; (ii) the rendered three-dimensional environment is representative of that particular physical space; and (iii) there are or may be one or more further client devices also in that particular physical space rendering the same or a corresponding virtual three-dimensional environment. From a computing perspective a process may be configured to determine whether the user is part of an onsite shared experience based on any one or more of the following techniques:

Specific manual configuration by the user or an administrator to place the client device in a specified onsite shared experience.

Geolocation methods, for example, determining that a current physical location is within a threshold range of a defined model location.

Recognition of physical artefacts via image processing of data collected by a VR headset camera (as discussed further below).

Functional block 204 represents a process including processing data received via the camera module, thereby to identify one or more artefacts. These artefacts may include, for example, landmarks, which are identifiable via AI-based image processing. Image processes may include edge detection, but in a preferred embodiment, AI image recognition is used. As will be appreciated by those skilled in the art, AI technologies perform processes, which include assessing pixel data to predict what object those pixels might represent, and prefers artefacts that are likely to be recognizable from many angles and lighting settings. For example: static objects with strong contrast and silhouettes. As such, preferred artefacts include door frames, room corners, a tree, and the like.

Functional block 205 represents a process including registering one or more of the identified artefacts against virtual artefacts in the three-dimensional environment, thereby to define a position and orientation of the virtual environment relative to those artefacts, and also thereby to determine a current position and orientation of the device in a known physical environment. This is preferably achieved by having pre-determined virtual anchor points that prescribe to specific or non-specific landmarks, such that when a landmark is identified the virtual environment is anchored to that location.

In a preferred embodiment, the first device to load the virtual environment is used thereby to define the position and orientation of the virtual environment relative to identified physical artefacts. Devices in the same physical location that subsequently load the model receive data representative of that the position and orientation of the virtual environment relative to identified physical artefacts, and based on that data are able to correctly align rendering of the virtual environment based on their own detection of the physical artefacts. As such, all of the devices render the virtual environment in a common position and orientation relative to the physical environment.

Functional block 206 represents a process including uploading the data representative of current position and orientation of the device to a server, such that the server is configured to provide to one or more further devices in the same physical space with data representative of the position and orientation of the device or a user of the device. The device performing method 200 also receives this data regarding other devices. This enables rendering in the virtual environment of virtual avatars representative of each user, thereby to facilitate collision avoidance.

It will be appreciated that current position and orientation is tracked over time. This may include any one or more of the following techniques:

Ongoing processing of image data to identify artefacts, and registration of those artefacts.

Recording of position and orientation between registration events using an IMU and/or other sensors in the VR headset.

Tracking of registered objects via image processing techniques.

Approximated tracking based on the device's movement.

This allows for conducting of a multi-user onsite virtual inspection, overcoming technical problems associated with collision management. In a practical sense, this is a particularly valuable outcome. For example, it allows a real estate agent to show a physical space to a group of people, and then guide them through the space via VR technology, allowing visualization of alternate styling options (e.g., paint, furniture, and the like), doing so in a collaborative shared environment.

In a further embodiment, a similar co-location technique is implemented thereby to enable shared experiences using augmented reality technology. For example, a plurality of users in a common physical space wear augmented reality glasses, and these glasses use a physical artefact detection process thereby to provide an objective common reference frame. This is used to enable rendering of AR content in a common position and orientation relative to the physical space, substantially in the same manner as described above (although with AR rather than VR). In one such embodiment, the AR content may be 2D content projected on a planar floor (for example, a 2D floorplan). This allows multiple AR users to have a shared experience with a common AR projected floorplan.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present disclosure may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present disclosure may include and may be included within fixed and portable devices such as desktop, laptop, and/or server. A module may be a component of a device, software, program, or system that implements some "functionality," which can be embodied as software, hardware, firmware, electronic circuitry, or etc.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments, but only by the scope of the accompanying claims.

It should be appreciated that in the above description of exemplary embodiments of the present disclosure, various features of the present disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out embodiments of the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B, which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A system configured to enable client device engagement with three-dimensional content thereby to enable virtual property inspections, the system including:
    a server system configured to receive and process requests from a plurality of client devices, wherein the requests include:
        (i) a request to access a specified three-dimensional model, in which case the server system is configured to enable downloading to the relevant client device of computer executable code representative of the model, such that the model is renderable at the client device;
        (ii) a request to operate as a guide device, in which case the server system is configured to enable hosting by the client device of a collaborative viewing event; and
        (iii) a request to operate as a participant device, in which case the server system is configured to enable participation by the client device of the collaborative viewing event;
    wherein the server system includes an engagement management module configured to facilitate concurrent multi-device engagement with a common three-dimensional model during a collaborative viewing event, wherein the engagement management module enables at least two modes of engagement, including:
        (i) a first mode of engagement, wherein each participant device selecting the first mode of engagement is enabled to control navigation in a three-dimensional environment rendered from downloaded data representative of the common three-dimensional model; and
        (ii) a second mode of engagement, wherein each participant device selecting the second mode of engagement is enabled to experience the three-dimensional environment rendered from downloaded data representative of the common three-dimensional model based on continuous real-time navigation instructions inputted by the guide device hosting the collaborative viewing event such that each participant device selecting the second mode of engagement is, at all times when the second mode is selected, provided with an identical view of the three-dimensional environment to that experienced by a user of the guide device.

2. The system of claim 1, wherein the server system includes an audio data transport module configured to enable audible communications during a collaborative viewing event between the host device and each participant device via: (i) a broadcast mode whereby audible communications from the host device are transmitted to all participant devices; and (ii) a direct mode, whereby audible communications from the host device are transmitted to a specific selection of one or more participant devices based on selections performed via the host device.

3. The system of claim 2, wherein the audible communications during a collaborative viewing event between the host device and each participant device includes two-way communication between the host device and each participant device, but without communication between participant devices.

4. The system of claim 1, wherein a given model is associated with two or more sets of model assets, wherein each set of model assets includes a respective collection of three-dimensional objects renderable at predefined locations in the three-dimensional environment rendered from downloaded data representative of the common three-dimensional model, and wherein each device is configured to enable swapping between viewing of the two or more sets of model assets.

5. The system of claim 4, including a model alternate asset control module configured to enable, during a collaborative viewing event, a control instruction provided via the host device to trigger swapping between viewing of the two or more sets of model assets at one or more participant devices.

6. The system of claim 1, further comprising a shared experience management module configured to enable a plurality of client devices, in the form of Virtual Reality headset devices, to experience a common model whilst physically located in a physical environment represented by the model, wherein each device performs a process thereby to determine a current position and orientation of the device based on comparison of artefacts in image data collected by the device and artefacts in the model data, wherein the shared experience management module is configured to receive current position and orientation data for a first one of the devices and provides to one or more other client devices data thereby to enable rendering of an avatar representing current location of a user of the first one of the devices.

7. The system of claim 1, wherein the system enables the guide device to access, for a device configured to operate as a guide device, the system enables access to an observation mode whereby:
    (i) a user of the guide device selects the observation mode; and
    (ii) the user of the guide device is provided with a display object, which renders a view corresponding to that being viewed by a participant device, which has selected the first mode of engagement and is engaging in controlled navigation in a three-dimensional environment rendered from downloaded data representative of the common three-dimensional model, such that the user of the guide device is able to observe that controlled navigation.

8. The system of claim 7, wherein, whilst in the observation mode, the user of the guide device is enabled to engage in audio communication with one or more users of the participant device.

9. The system of claim 7, wherein, whilst in the observation mode, the user of the guide device is enabled select between a plurality of participant devices, which are each independently engaging in controlled navigation of the same three-dimensional environment.

10. The system of claim 1, wherein the system enables multi-modal interaction with the three-dimensional model via a given user device, including:
   (i) a reduced scale mode, in which the three-dimensional model is projected relative to a physical-world space at a reduced scale, thereby to enable navigation of the three-dimensional model in a reduced-scale setting; and
   (ii) a full-scale mode, in which the three-dimensional model is projected relative to the physical-world space at full scale, thereby to enable navigation of the three-dimensional model in a full-scale setting.

11. The system of claim 10, wherein, for the reduced scale mode, parameters for the reduced scale mode are defined relative to a physical world projection surface designated by a user via orientation of an image capture device.

12. The system of claim 10, wherein, for the reduced scale mode, a user is enabled to toggle display of one or more display layers and/or artefacts of the three-dimensional model, thereby to facilitate internal navigation of an enclosed virtual space from an external viewing position.

13. The system of claim 10, wherein, for the reduced scale mode, a user is enabled one or more display layers and/or artefacts of the three-dimensional model are not rendered, thereby to facilitate internal navigation of an enclosed virtual space from an external viewing position.

14. The system of claim 10, wherein, for the full-scale mode, orientation for projection of the model relative to the physical world are defined relative to a physical world projection region designated by a user via orientation of an image capture device.

15. The system of claim 1, wherein an analytics module is configured to, in respect of each participant device selecting the first mode of engagement, record data representative of the controlled navigation in the three-dimensional environment, and provide data representative of one or more of the following: (i) a number of times a specific object/region/zone of the environment has been viewed; and (ii) a cumulative time for which a specific object/region/zone of the environment has been viewed.

16. A method for enabling engagement with a three-dimensional model via a device having a display screen and a camera module, the method including:
   accessing data representative of a three-dimensional model;
   selecting between a reduced-scale mode and a full-scale mode;
   rendering the three-dimensional model via the display screen, thereby to enable a user to navigate a rendered three-dimensional virtual environment, wherein the three-dimensional model is projected relative to a physical world environment such that:
      (ii) in the reduced scale mode, the three-dimensional model is projected as a reduced scale virtual environment locked in position and orientation relative to a physical environment captured by the camera module and shown on the display screen at a scale of less than 2:1, wherein the scale is determined based on computer logic based on a size of a physical world surface identified via processing of image data captured via a camera model, being a surface onto which the three-dimensional model is to be projected via augmented reality technology; and
      (ii) in the full-scale mode, the three-dimensional model is projected as a full scale virtual environment locked in position and orientation relative to the physical environment at a scale of 1:1.

17. The method of claim 16, wherein, for the reduced scale mode, a user is enabled one or more display layers and/or artefacts of the three-dimensional model are not rendered, thereby to facilitate internal navigation of an enclosed virtual space from an external viewing position.

18. The method of claim 16, wherein, for the reduced scale mode, parameters for the reduced scale are defined relative to a physical world projection surface designated by a user via orientation of an image capture device.

* * * * *